US007215349B2

(12) United States Patent
Sakaue et al.

(10) Patent No.: US 7,215,349 B2

(45) Date of Patent: May 8, 2007

(54) METHOD AND APPARATUS FOR IMAGE FORMING CAPABLE OF EFFECTIVELY AVOIDING AN ADVERSE TEMPERATURE EFFECT TO AN OPTICAL SCANNING SYSTEM

(75) Inventors: Yoshinobu Sakaue, Kawasaki (JP); Kazunori Bannai, Tokyo (JP); Kozo Yamazaki, Kamakura (JP)

(73) Assignee: Ricoh Co., Ltd., Tokyo (JP)

( * ) Notice: Subject to any disclaimer, the term of this patent is extended or adjusted under 35 U.S.C. 154(b) by 300 days.

(21) Appl. No.: 10/984,930

(22) Filed: Nov. 10, 2004

(65) Prior Publication Data

US 2005/0174418 A1 Aug. 11, 2005

(30) Foreign Application Priority Data

Nov. 11, 2003 (JP) ............................ 2003-381190

(51) Int. Cl.
*G02B 26/10* (2006.01)

(52) U.S. Cl. ...................... 347/138; 347/242; 347/245; 347/257; 347/263

(58) Field of Classification Search ................ 347/138, 347/152, 242, 245, 257, 26
See application file for complete search history.

(56) References Cited

U.S. PATENT DOCUMENTS

| | | | |
|---|---|---|---|
| 4,853,710 | A | 8/1989 | Shimada et al. |
| 4,933,727 | A | 6/1990 | Mizuma et al. |
| 4,987,428 | A | 1/1991 | Bannai et al. |
| 5,055,860 | A | 10/1991 | Bannai et al. |
| 5,121,170 | A | 6/1992 | Bannai et al. |
| 5,160,969 | A | 11/1992 | Mizuma et al. |
| 5,219,154 | A | 6/1993 | Fukube et al. |
| 5,224,693 | A | 7/1993 | Taguchi et al. |
| 5,227,842 | A | 7/1993 | Hayashi et al. |
| 5,255,904 | A | 10/1993 | Taguchi et al. |
| 5,270,783 | A | 12/1993 | Bisaiji et al. |
| 5,297,376 | A | 3/1994 | Taguchi et al. |
| 5,315,322 | A | 5/1994 | Bannai |
| 5,316,282 | A | 5/1994 | Fukube et al. |
| 5,325,213 | A | 6/1994 | Takahashi et al. |
| 5,390,033 | A | 2/1995 | Bannai et al. |
| 5,471,277 | A | 11/1995 | Fujioka et al. |
| 5,583,607 | A | 12/1996 | Fujioka et al. |
| 5,583,662 | A | 12/1996 | Takahashi et al. |
| 5,610,720 | A | 3/1997 | Fujioka et al. |
| 5,682,227 | A | 10/1997 | Taguchi et al. |
| 5,689,348 | A | 11/1997 | Takahashi et al. |

(Continued)

FOREIGN PATENT DOCUMENTS

| | | |
|---|---|---|
| JP | 63-221367 | 9/1988 |

(Continued)

*Primary Examiner*—Huan Tran
(74) *Attorney, Agent, or Firm*—Oblon, Spivak, McClelland, Maier & Neustadt, P.C.

(57) ABSTRACT

An image forming apparatus includes a first support member, an image carrying member configured to carry a toner image thereon, and an optical writing apparatus connected to the first support member and configured to form an electrostatic latent image on the image carrying member. The optical writing apparatus includes an optical system having at least one optical element, a first casing configured to support the optical system, and a second casing configured to encase the first casing and to prevent intrusion of dust to the optical system.

58 Claims, 6 Drawing Sheets

U.S. PATENT DOCUMENTS

| | | | |
|---|---|---|---|
| 5,847,845 | A | 12/1998 | Takahashi et al. |
| 6,075,624 | A | 6/2000 | Bannai et al. |
| 6,151,057 | A | 11/2000 | Yamazaki et al. |
| 6,697,092 | B2 | 2/2004 | Bannai |
| 2002/0126193 | A1 | 9/2002 | Maki et al. |
| 2003/0039486 | A1 | 2/2003 | Bannai et al. |
| 2003/0206748 | A1 | 11/2003 | Nakazato et al. |
| 2003/0214694 | A1 | 11/2003 | Sakai |
| 2004/0036761 | A1 | 2/2004 | Bannai |
| 2004/0100550 | A1 | 5/2004 | Bannai et al. |
| 2004/0196507 | A1 | 10/2004 | Sakai |

FOREIGN PATENT DOCUMENTS

| | | | |
|---|---|---|---|
| JP | 5-323774 | | 12/1993 |
| JP | 6-148553 | | 5/1994 |
| JP | 6-301248 | | 10/1994 |
| JP | 10-232360 | | 9/1998 |
| JP | 2001-183897 | | 7/2001 |
| JP | 2003-29189 | | 1/2003 |
| JP | 2004-61745 | * | 2/2004 |

* cited by examiner

METHOD AND APPARATUS FOR IMAGE FORMING CAPABLE OF EFFECTIVELY AVOIDING AN ADVERSE TEMPERATURE EFFECT TO AN OPTICAL SCANNING SYSTEM

CROSS REFERENCE TO RELATED APPLICATION

The present application claims priority to Japanese patent application no. 2003-381190, filed on Nov. 11, 2003, the disclosure of which is incorporated by reference herein in its entirety.

BACKGROUND OF THE INVENTION

1. Field of the Invention

The present invention relates to an optical writing apparatus and an image forming apparatus including the optical writing apparatus.

2. Discussion of the Related Art

Typically, an image forming apparatus using electrophotography includes an optical writing apparatus for writing an electrostatic latent image on an image carrying member (e.g., a photoconductive member).

The optical writing apparatus includes an optical system having a plurality of optical elements such as light source unit, a polygon mirror, a scanning lens, a reflection mirror, and a casing to support and encase such optical system in a dustproof manner.

Conventionally, such casing is made from a resinous material to provide a light-weight and low cost structure, or from a material having a low line expansion coefficient (e.g., metal) to suppress a deformation of the casing due to a temperature change.

As for an optical writing apparatus having a casing made from a resinous material, such casing expands and contracts in response to a temperature change.

The expansion or contraction of the casing wall leads to displacement of optical elements in the casing from their original positions, resulting in a change of distance (i.e., change of relative position) between the optical elements.

For example, a light beam emitted from a semiconductor laser in a light source unit may not be irradiated at an adequate position on an image carrying member when a relative position between the optical elements is changed.

As for an optical writing apparatus having a casing made from a metal, expansion or contraction of such casing in response to a temperature change is relatively small compared to the casing made from a resinous material, resulting in a reduction of the change of the relative position between the optical elements in the casing. However, the casing made from the metal increases its manufacturing cost and weight of the optical writing apparatus.

SUMMARY OF THE INVENTION

In view of the foregoing, it is an object of the present invention to provide an image forming apparatus which can effectively avoid an adverse temperature effect on an optical writing system.

To achieve this and other objectives, the present invention provides an image forming apparatus includes a first support member, an image carrying member configured to carry a toner image thereon, and an optical writing apparatus connected to the first support member and configured to form an electrostatic latent image on the image carrying member.

The optical writing apparatus includes an optical system having at least one optical element, a first casing configured to support the optical system, and a second casing configured to encase the first casing and to prevent intrusion of dust to the optical system.

The present invention can further provide an image forming apparatus including means for supporting, means for carrying an image, and means for optically writing an electrostatic latent image on the means for carrying, the means for optically writing connected to the means for supporting. The means for optically writing includes an optical system having at least one optical element, a first casing configured to support the optical system, and a second casing configured to encase the first casing and to prevent intrusion of dust to the optical system.

The present invention can still further provide an optical writing apparatus configured to be connected to a first supporting member of an image forming apparatus, including an optical system having at least one optical element, a first casing configured to support the optical system, and a second casing configured to encase the first casing and to prevent intrusion of dust to the optical system.

The present invention can still further provide an optical writing apparatus configured to be connected to a first supporting member of an image forming apparatus, including an optical system having at least one optical element, means for supporting the optical system, including a first material having a first line expansion coefficient, and means for encasing the means for supporting and for preventing intrusion of dust to the optical system, the means for encasing including a second material having a second line expansion coefficient, wherein the first line expansion coefficient is less than the second line expansion coefficient.

The present invention still further provides a method of providing an optical writing apparatus for an image forming apparatus, including providing an optical system having at least one optical element in a first casing, disposing the first casing in a second casing, and covering the second casing with a cover.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
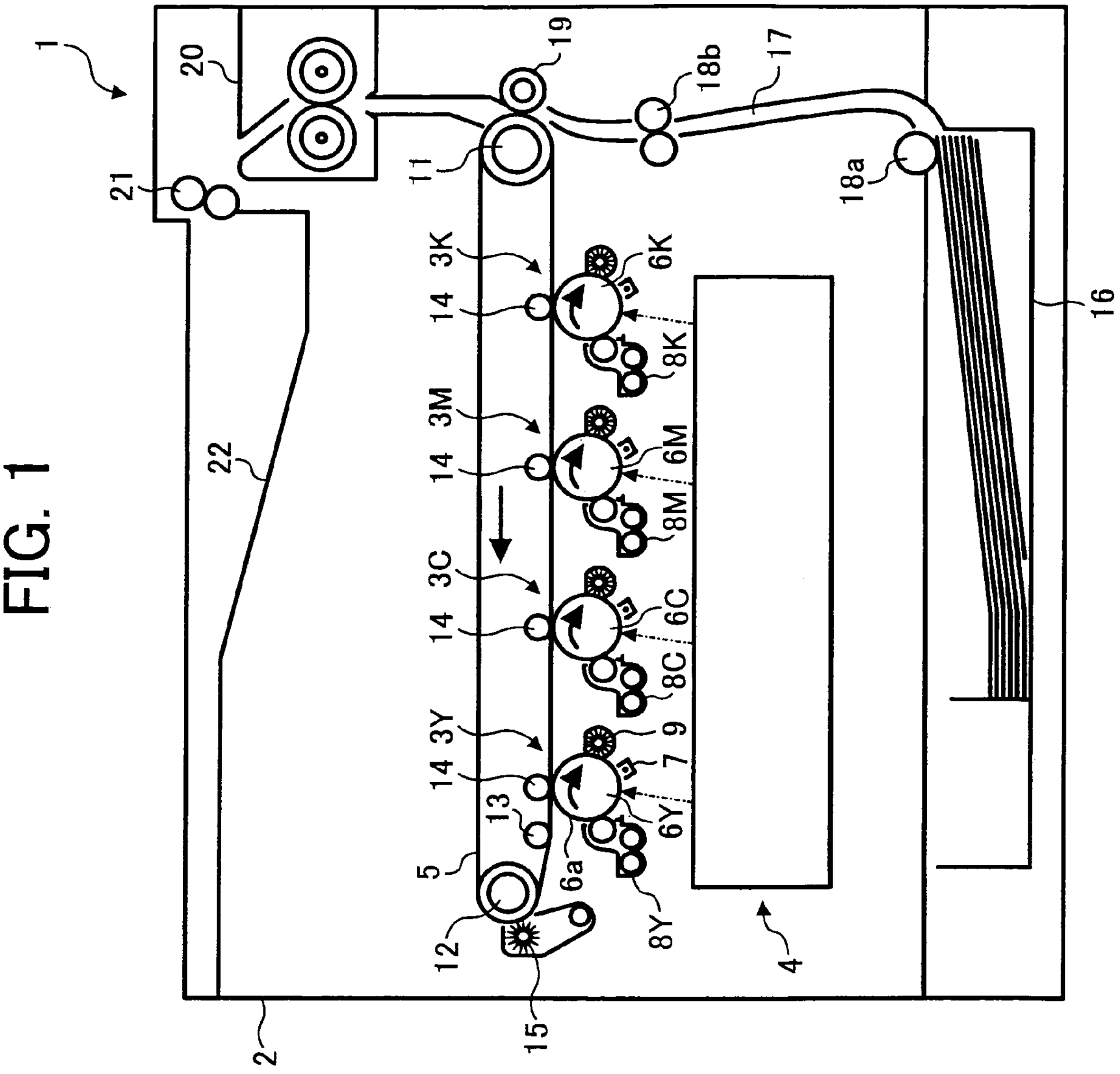
FIG. 1 is a sectional view of an image forming apparatus according to an embodiment of the present invention.

In describing preferred embodiments illustrated in the drawings, specific terminology is employed for clarity.

However, the disclosure of the present invention is not intended to be limited to the specific terminology so selected and it is to be understood that each specific element includes all technical equivalents that operate in a similar manner.

Referring now to the drawings, wherein like reference numerals designate identical or corresponding parts throughout the several views, FIGS. 1–4 show an exemplary configuration of an image forming apparatus having an optical writing apparatus according to an embodiment of the present invention.

As illustrated in FIG. 1, the image forming apparatus 1 includes a housing 2, four image forming units 3Y, 3C, 3M, and 3K, an optical writing apparatus 4 for image-writing, an intermediate transfer belt 5 as an intermediate transfer member, support rollers 11, 12, and 13, a belt cleaning unit 15, a sheet feeding cassette 16, a sheet feed path 17, a sheet feed roller 18*a*, a registration roller 18*b*, a second transfer roller 19, a fixing unit 20, and a sheet ejection roller 21, and a sheet ejection tray 22.

The housing 2 includes a frame (not shown) made from a metal, and a cover (not shown) made from a resinous material attached to the frame. The frame of the housing 2 supports the image forming units 3Y, 3C, 3M, and 3K, the optical writing apparatus 4, and the intermediate transfer belt 5, that is, the housing 2 functions as a support member for the image forming units 3Y, 3C, 3M, and 3K, the optical writing apparatus 4, and the intermediate transfer belt 5.

The housing 2 is preferably made from iron, aluminum, or an alloy containing iron or aluminum, and more preferably made from iron or an alloy containing iron.

Each of the support rollers 11, 12, and 13 also functions as a support member, and supports the intermediate transfer belt 5.

The support rollers 11, 12, and 13 are preferably made from iron, aluminum, or an alloy containing iron or aluminum, and more preferably made from iron or an alloy containing iron as in the housing 2.

Each of the image forming units 3Y, 3C, 3M, and 3K includes photoconductive members 6Y, 6C, 6M, and 6K, respectively, a charging unit 7, developing units 8Y, 8C, 8M, and 8K, respectively, a cleaning unit 9, and a first transfer roller 14.

Each of the image forming units 3Y, 3C, 3M, and 3K has a structure similar to one another, and generates respective color toner images. As for the image forming units 3Y, 3C, 3M, and 3K, and components for the image forming units 3Y, 3C, 3M, and 3K in the specification and drawings, reference characters Y (yellow), C (cyan), M (magenta), and K (black) are used to refer to the color of the toner images generated by the image forming units.

The intermediate transfer belt 5 may be shaped in a loop form made from a resinous material film or a rubber. The intermediate transfer belt 5 is supported by the support rollers 11, 12, and 13, and is driven in the direction indicated by the arrow in FIG. 1.

The support rollers 11, 12, and 13 are connected to the frame of the housing 2. Accordingly, the intermediate transfer belt 5 is coupled to the frame of the housing 2 via the support rollers 11, 12, and 13. Therefore, the support rollers 11, 12, and 13 and the frame of the housing 2 support the intermediate transfer belt 5.

The support rollers 11, 12, and 13 and the housing 2 may have a similar line expansion coefficient because each is preferably made from iron, aluminum, or an alloy containing iron or aluminum, and more preferably made from iron or an alloy containing iron as above described.

Each of the photoconductive members 6Y, 6C, 6M, and 6K is cylindrically shaped, and rotated by a driver (not shown) in the direction indicated by the arrows in FIG. 1. Furthermore, each of the photoconductive members 6Y, 6C, 6M, and 6K has an outer surface 6*a* including a photoconductive layer.

The charging unit 7 uniformly charges the outer surface 6*a* of each of the photoconductive members 6Y, 6C, 6M, and 6K. The charging unit 7 may be a non-contact type that does not contact the photoconductive members 6Y, 6C, 6M, and 6K.

The outer surface 6*a* of each of the photoconductive members 6Y, 6C, 6M, and 6K charged by the charging unit 7 is scanned by a light beam emitted from the optical writing apparatus 4.

The light beam emitted from the optical writing apparatus 4 scans the outer surface 6*a* of each of the photoconductive members 6Y, 6C, 6M, and 6K, and an electrostatic latent image corresponding to original image data is written on the outer surface 6*a* of each of the photoconductive members 6Y, 6C, 6M, and 6K.

Each of the developing units 8Y, 8C, 8M, and 8K supplies respective toner to the photoconductive members 6Y, 6C, 6M, and 6K, respectively, to develop the electrostatic latent image written to the outer surface 6*a* of each of the photoconductive members 6Y, 6C, 6M, and 6K.

When the supplied toner adheres to the electrostatic latent image, the electrostatic latent image is made visible as a toner image.

Each of the developing units 8Y, 8C, 8M, and 8K may be a non-contact type developing unit that does not contact the photoconductive members 6Y, 6C, 6M, and 6K, respectively.

The toner image formed on each of the photoconductive members 6Y, 6C, 6M, and 6K is transferred to the intermediate transfer belt 5 by the first transfer roller 14 provided on an inner surface of the intermediate transfer belt 5.

The cleaning unit 9 removes the toner remaining on the outer surface 6*a* of each of the photoconductive members 6Y, 6C, 6M, and 6K after transferring the toner image to the intermediate transfer belt 5. The cleaning unit 9 may be a brush type in which a brush contacts the outer surface 6*a* of each of the photoconductive members 6Y, 6C, 6M, and 6K.

In a lower part of the housing 2, the sheet feeding cassette 16 is disposed under the image forming units 3Y, 3C, 3M, and 3K, and the optical writing apparatus 4.

Recording sheets stacked and stored in the sheet feeding cassette 16 are sequentially fed one by one from the uppermost position of the stacked recording sheets in the sheet feeding cassette 16.

The recording sheet fed from the sheet feeding cassette 16 is transported along the sheet feed path 17.

The sheet feed roller 18*a*, the registration roller 18*b*, the second transfer roller 19, and the fixing unit 20 are disposed between the sheet feeding cassette 16 and the sheet ejection roller 21 along the sheet feed path 17.

The recording sheet is transported to a position facing the registration roller 18*b* and suspended at such position temporarily.

The registration roller 18*b* is driven intermittently with a predetermined timing, such that the recording sheet is fed to a nip position between the intermediate transfer belt 5 and the second transfer roller 19. When the recording sheet passes through the nip position, the toner image on the intermediate transfer belt 5 is transferred to the recording sheet.

The recording sheet is then transported to the fixing unit 20.

The fixing unit 20 fixes the toner image on the recording sheet by applying heat and pressure to the toner image on the recording sheet. The applied heat and pressure melt and fix the toner image on the recording sheet. The recording sheet processed by the fixing unit 20 is ejected by the sheet ejection roller 21 to the sheet ejection tray 22 provided on the upper part of the housing 2.

After transferring the toner image from the intermediate transfer belt 5 to the recording sheet, the belt cleaning unit 15 provided on an outer surface of the intermediate transfer belt 5 removes toner or paper powder remaining on the outer surface of the intermediate transfer belt 5.

The optical writing apparatus 4 is now discussed with reference to FIGS. 2–4.

Figure 4:
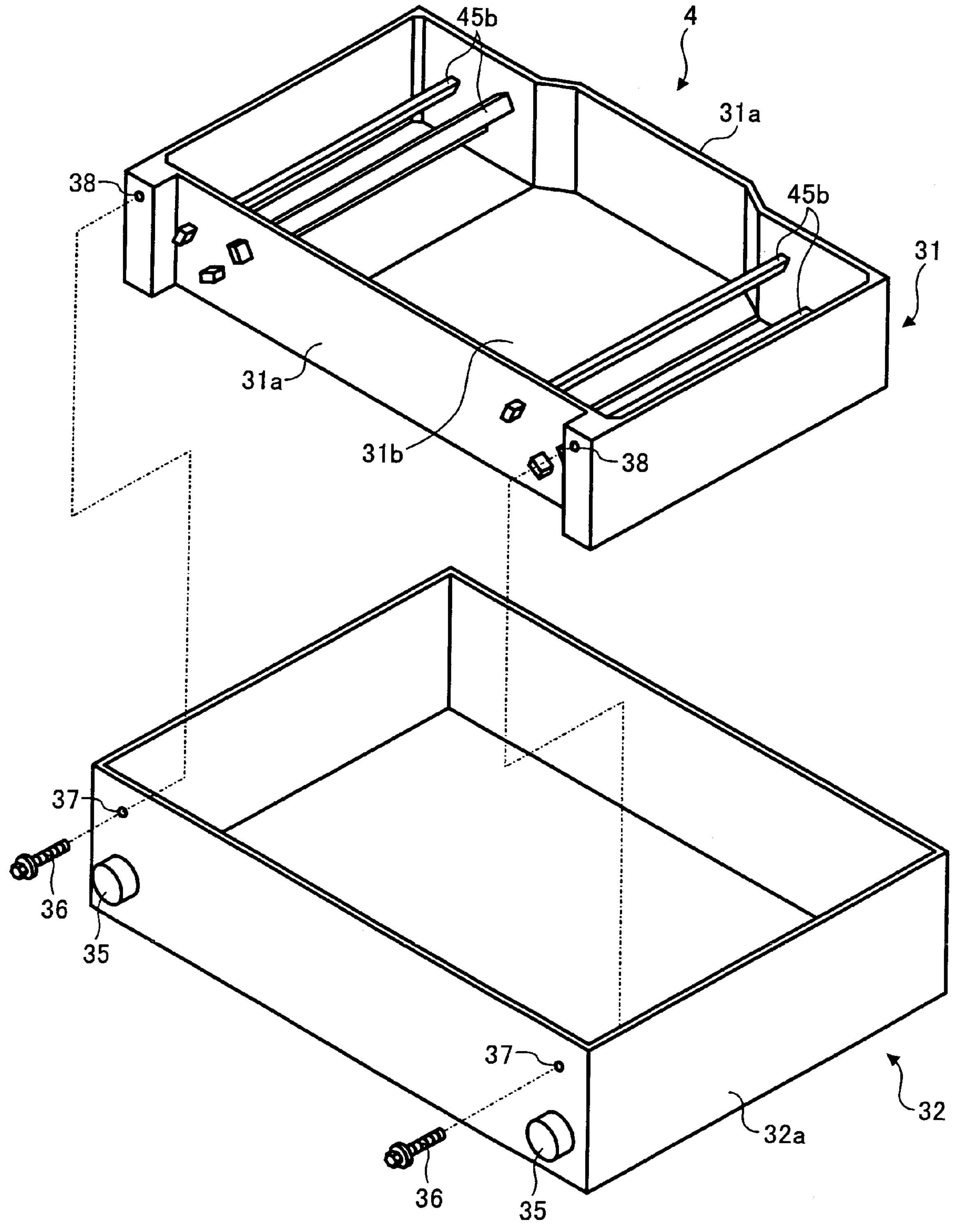
FIG. 4 is a perspective view of a first casing and a second casing of an optical writing apparatus according to an embodiment of the present invention.

As illustrated in FIG. 4, the optical writing apparatus 4 includes a first casing 31 and a second casing 32. The first casing 31 supports a plurality of optical elements therein.

Figure 2:
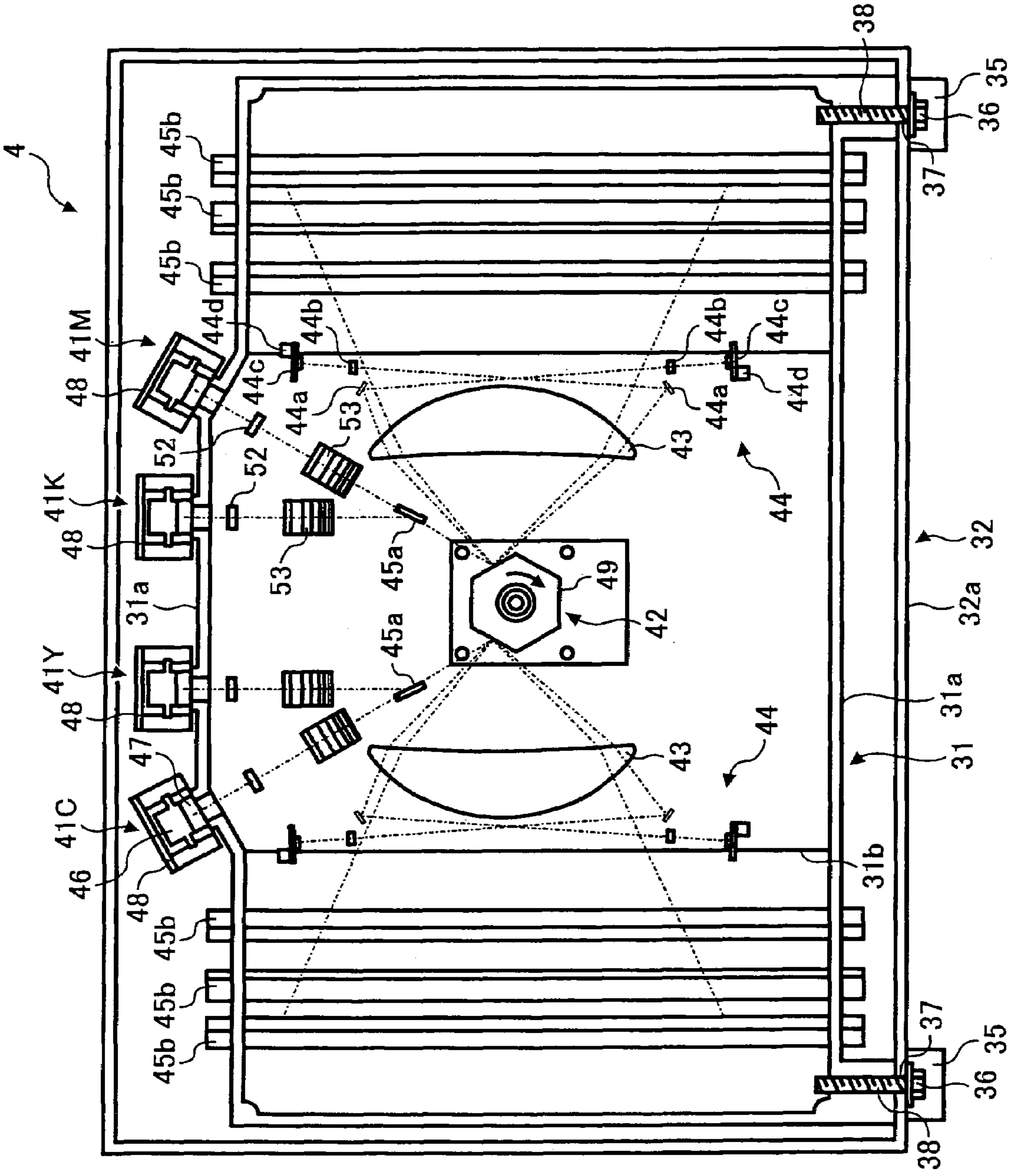
FIG. 2 is a plan view of an optical writing apparatus according to an embodiment of the present invention.
Figure 3:
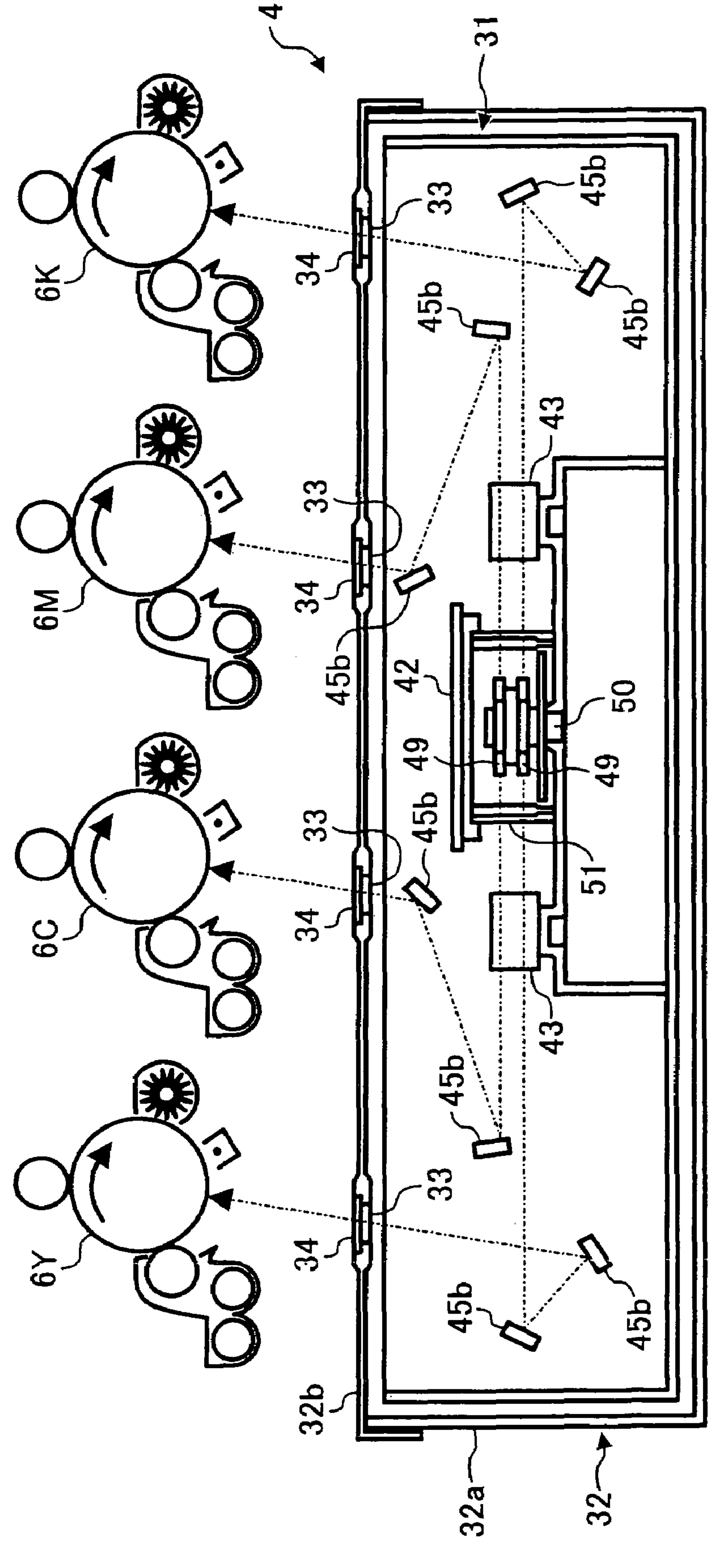
FIG. 3 is a sectional view of an optical writing apparatus according to an embodiment of the present invention.

As illustrated in FIGS. 2–4, the second casing 32 encases or surrounds a portion of the first casing 31.

As illustrated in FIG. 3, the second casing 32 includes a body 32*a* and a cover 32*b* for covering an opening of the body 32*a*, and encases the first casing 31 supporting the plurality of optical elements in a dustproof manner to maintain performances of the optical elements.

The body 32*a* and the cover 32*b* may be made from a resinous material, thus the second casing 32 has a light-weight structure that can be manufactured at a relatively low cost.

The cover 32*b* is provided with four openings 33, through which a light beam passes. A dustproof member 34 is attached to each of the openings 33 to allow a passage of the light beam and to prevent an intrusion of dust. The dustproof member 34 may be a flat glass.

As illustrated in FIG. 4, a connection member 35 is formed on a side face of the body 32*a* of the second casing 32. The connection member 35 is used to connect the second casing 32 to the frame of the housing 2. By engaging the connection member 35 to a concave portion (not shown) formed in the frame of the housing 2, the optical writing apparatus 4 is connected to the housing 2.

The first casing 31 is shaped in a container form, and includes a plurality of side faces 31*a*, a bottom face 31*b*, and at least one opening side.

The first casing 31 is preferably made from iron, aluminum, or an alloy containing iron or aluminum, and more preferably made from iron or an alloy containing iron as in the frame of the housing 2.

As illustrated in FIG. 4, at least one pair of the side faces 31*a* are substantially parallel to each other, and the bottom face 31*b* is provided on the bottom side of the first casing 31.

The first casing 31 has a relatively lower line expansion coefficient compared to the second casing 32 made from a resinous material.

The first casing 31 supports the plurality of optical elements therein, and is encased and connected (fixed) to the second casing 32.

By encasing the first casing 31 in the second casing 32, the plurality of optical elements in the first casing 31 is protected from dust by the second casing 32 as illustrated in FIG. 3.

A screw 36 is used to connect the first casing 31 and the second casing 32.

The first casing 31 is connected to the second casing 32 at an area close to the connection member 35 of the second casing 32.

Specifically, a through hole 37 for inserting the screw 36 is formed at an area of the side face of the body 32*a* having the connection member 35. In an embodiment of the present invention, the through hole 37 is provided to an area close to the connection member 35 as illustrated in FIG. 4.

A female screw 38 is threaded in a side face of the first casing 31 such that the female screw 38 faces the through hole 37.

By screwing the screw 36 to the female screw 38 via the through hole 37, the first casing 31 is fixedly connected to the second casing 32 as illustrated in FIG. 2.

As illustrated in FIG. 2, the plurality of optical elements supported in the first casing 31 includes four light source units 41Y, 41C, 41M, and 41K for emitting a light beam, a light deflector 42 for reflecting the light beam coming from each of the light source unit 41Y, 41C, 41M, and 41K in two symmetrical directions for deflecting scanning, a scanning lens (i.e., f-theta lens) 43 for focusing the light beam for deflecting scanning on each of the photoconductive members 6Y, 6C, 6M, and 6K with a desired dimension (size), a synchronization detection unit 44 for detecting a scanning initiation timing of the light beam, and a first reflection mirror 45*a* and a second reflection mirror 45*b* for reflecting the light beam to the photoconductive members 6Y, 6C, 6M, and 6K.

Each of the light source units 41Y, 41C, 41M, and 41K includes a semiconductor laser 46, a collimate lens 47 to collimate a light beam emitted from the semiconductor laser 46, and a drive circuit for the semiconductor laser (not shown).

Each of the light source units 41Y, 41C, 41M, and 41K is fixed to one of the side faces 31*a* of the first casing 31 with a holding member 48. Each of the light source units 41Y, 41C, 41M, and 41K may include a laser-diode.

The light deflector 42 includes a polygon mirror 49 having two mirrors in a double-decked manner, a polygon motor 50 to rotate the polygon mirror 49, a soundproof glass 51 for covering the polygon mirror 49 and the polygon motor 50 as illustrated in FIG. 3. The light deflector 42 is supported on the bottom face 31*b* of the first casing 31.

The scanning lens 43 is supported on the bottom face 31*b* of the first casing 31.

As illustrated in FIG. 2, the synchronization detection unit 44 includes a synchronization detection mirror 44*a*, a focus lens 44*b*, a photoelectric element 44*c*, a circuit board 44*d* having the photoelectric element 44*c* thereon, and a support member (not shown) for supporting the above-mentioned components. The support member of the synchronization detection unit 44 is supported on the bottom face 31*b* of the first casing 31.

The first reflection mirror 45*a* is supported on the bottom face 31*b* of the first casing 31.

The second reflection mirror 45*b* is substantially shaped as a rectangular parallelepiped, and each end portion of the second reflection mirror 45*b* is supported by the side face 31*a* of the first casing 31.

As for the image forming apparatus, original image data is input by a document scanner (not shown) or an image-data output apparatus (e.g., personal computer, word processor, facsimile), and is divided into respective optical colors. Then, the respective optical colors are converted to respective signals.

Based on the respective signals, each of the light source units 41Y, 41C, 41M, and 41K of the optical writing apparatus 4 emits a light beam by driving the semiconductor laser 46 provided to each of the light source units 41Y, 41C, 41M, and 41K.

The light beam emitted from each of the light source units 41Y and 41K passes through an aperture 52 and a cylinder lens 53 for optical face angle error correction, reflects at the first reflection mirror 45*a*, and reaches the light deflector 42.

The light beam emitted from each of the light source units 41C and 41M passes through an aperture 52 and a cylinder lens 53 for optical face angle error correction, and reaches the light deflector 42.

Then, the polygon mirror 49 is rotated by the polygon motor 50 at a constant angular velocity and reflects each light beam in two symmetrical directions for deflecting scanning.

The aperture 52 and the cylinder lens 53 are also supported on the bottom face 31*b* of the first casing 31, and encased in the first casing 31.

Specifically, in an embodiment of the present invention, each of two light beams coming from one direction reflects at the polygon mirror 49 in two symmetrical directions for deflecting scanning, and each of another two light beams coming from another direction reflects at the polygon mirror 49 to another respective two symmetrical directions for deflecting scanning.

Then, each of the light beams passes through the scanning lens 43, reflects at the second reflection mirror 45*b*, passes through the dustproof member 34, and irradiates the outer surface 6*a* of each of the photoconductive members 6Y, 6C, 6M, and 6K to write an electrostatic latent image.

During such irradiation, each of the light beams irradiates on each of the outer surface 6*a* of each of the photoconductive members 6Y, 6C, 6M, and 6K with a substantially same angle of incidence.

The synchronization detection unit 44 receives the light beam passed through the scanning lens 43 and reflected by the synchronization detection mirror 44*a* to output a synchronization signal for scanning initiation used for determining an initiation timing for writing. Such synchronization detection is performed to set a scanning timing of the light beam.

The light beam emitted from the semiconductor laser 46 is scanned by the rotating polygon mirror 49 in the optical writing apparatus 4, and reaches the synchronization detection unit 44, as illustrated by a dashed line in FIG. 2.

The synchronization detection unit 44 may be disposed such that the light beam is received by the synchronization detection unit 44 before scanning the light beam, and may be disposed such that the light beam is received by the synchronization detection unit 44 after scanning the light beam to detect a variation of one scanning velocity or one scanning time.

FIG. 2 shows an exemplary configuration that disposes the two synchronization detection units 44 before and after scanning the light beam to determine synchronization of the light beam.

When a temperature change occurs in the optical writing apparatus 4, the second casing 32 expands or contracts due to such temperature change.

However, the effect of such expansion or contraction to the first casing 31 can be reduced because the first casing 31 is preferably made from iron, aluminum, or an alloy containing iron or aluminum, and more preferably made from iron or an alloy containing iron, which have relatively lower line expansion coefficients.

Therefore, a positional displacement of the optical elements supported in the first casing 31 and a change of relative positions between the optical elements in the first casing 31 can be reduced.

Furthermore, a deformation of the first casing 31 caused by an expansion or contraction of the second casing 32 due to a temperature change can be reduced because a connection point for the frame of the housing 2 and the second casing 32 and a connection point for the first casing 31 and the second casing 32 are close to each other.

Under such configuration, a positional displacement of the optical elements in the optical writing apparatus 4 can be reduced even if a temperature change occurs in the optical writing apparatus 4.

Accordingly, the light beam emitted from the optical writing apparatus 4 can be irradiated at an adequate position on each of the photoconductive members 6Y, 6C, 6M, and 6K.

A positional displacement of the first reflection mirror 45*a* and the second reflection mirror 45*b* significantly affects irradiation positions of the light beam. Therefore, reducing the positional displacement of the first reflection mirror 45*a* and the second reflection mirror 45*b* significantly reduces a positional displacement of the light beam to be irradiated on the photoconductive members 6Y, 6C, 6M, and 6K.

Therefore, a light-weight and relatively low cost material can be chosen for the second casing 32 without considering line expansion coefficient of materials, resulting in a light-weight and low cost optical writing apparatus 4.

In an embodiment of the present invention, the first casing 31 is connected to the second casing 32 at two positions. Under such configuration, a deformation of the second casing 32 between the two connection positions is suppressed by the first casing 31. Thus, the first casing 31 functions as a reinforcement member for the second casing 32.

In an embodiment of the present invention, the deformation of the second casing 32 can be suppressed because the first casing 31 is preferably made from iron, aluminum, or an alloy containing iron or aluminum, and more preferably made from iron or an alloy containing iron, which have a relatively higher rigidity compared to the second casing 32 made from a resinous material.

With such configuration, a displacement of the irradiation position of the light beam for writing an electrostatic latent image on each of the photoconductive members 6Y, 6C, 6M, and 6K can be reduced even when temperature changes occurs.

Configurations for suppressing the deformation of the second casing 32 are not limited to the above-mentioned configuration, and can include for example a configuration in which an entire one side face of the first casing 31 is connected to the second casing 32, or a configuration in which a pair of side faces of the first casing 31 are connected to the second casing 32.

The first casing 31 and the frame of the housing 2 supporting the photoconductive members 6Y, 6C, 6M, and 6K have a substantially same line expansion coefficient.

Under such configuration, the photoconductive members 6Y, 6C, 6M, and 6K supported by the frame of the housing 2 and the optical elements supported by the first casing 31 displace in a substantially same manner when a temperature change occurs.

Therefore, a change of relative position between the photoconductive members 6Y, 6C, 6M, and 6K and the optical elements in the first casing 31 can be reduced, and irradiation positions of the light beam on each of the photoconductive members 6Y, 6C, 6M, and 6K can be maintained at adequate positions.

Accordingly, a displacement of respective color images can be reduced.

Furthermore, the frame of the housing 2 also supports the photoconductive members 6Y, 6C, 6M, and 6K and the intermediate transfer belt 5.

Because the frame of the housing 2 and the support rollers 11, 12, and 13 supporting the intermediate transfer belt 5 have a substantially same line expansion coefficient, a change of relative position between the photoconductive members 6Y, 6C, 6M, and 6K and the intermediate transfer belt 5 can be reduced even if a temperature change occurs, and an intermediate transfer of the toner images from the photoconductive members 6Y, 6C, 6M, and 6K to the intermediate transfer belt 5 can be performed.

Accordingly, a displacement of respective color images can be reduced.

An optical writing apparatus according to another embodiment of the present invention is discussed with reference to FIGS. 5 and 6, wherein like reference numerals in FIGS. 1 and 4 designate identical or corresponding parts in FIGS. 5 and 6, and explanations thereof are omitted.

An optical writing apparatus 60 has a similar configuration to the optical writing apparatus 4.

Figure 5:
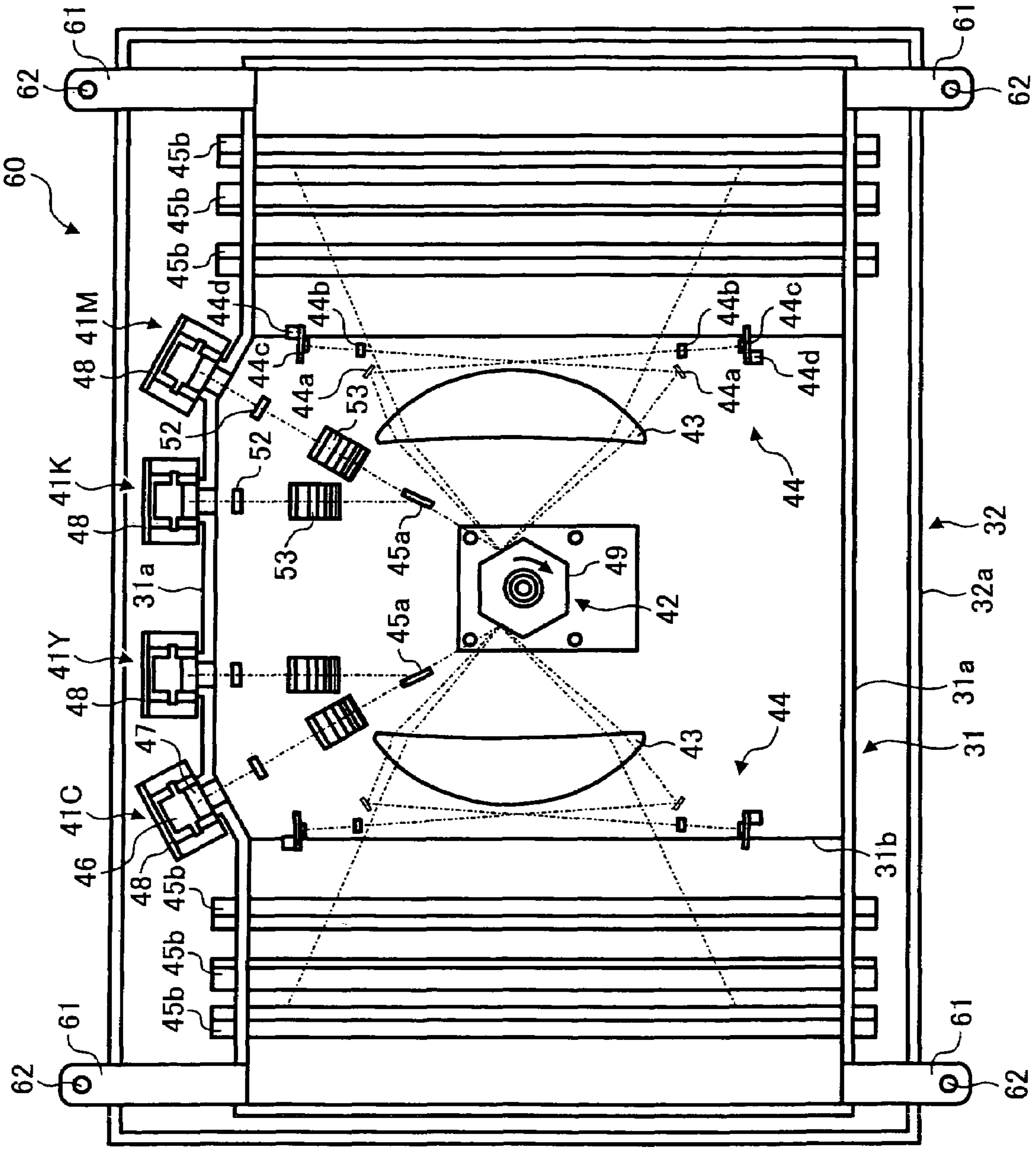
FIG. 5 is another plan view of an optical writing apparatus according to another embodiment of the present invention.

As illustrated in FIG. 5, the optical writing apparatus 60 includes the first casing 31 supporting a plurality of optical elements therein, and the second casing 32.

The first casing 31 is preferably made from iron, aluminum, or an alloy containing iron or aluminum, and more preferably made from iron or an alloy containing iron, and the second casing 32 is made from a resinous material.

The optical writing apparatus 60, however, also has four connection members 61 integrally formed at four corners of the first casing 31 to connect the optical writing apparatus 60 to the frame of the housing 2.

Each of the four connection members 61 protrudes from the second casing 32, and is provided with a through hole 62 therein.

A connection screw (not shown) is screwed in a female screw (not shown) threaded in the frame of the housing 2 via the through hole 62 to connect the optical writing apparatus 60 to the frame of the housing 2.

Figure 6A:
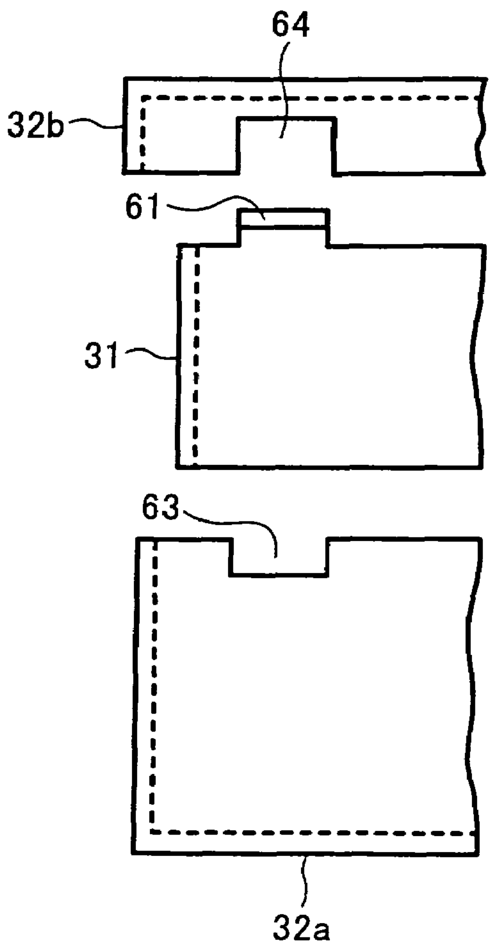
FIG. 6A is a partial view of a first casing and a second casing of the optical writing apparatus of FIG. 5.

As illustrated in FIG. 6A, a first concave portion 63 corresponding to a position and thickness of the connection member 61 is formed in the body 32*a* of the second casing 32. In addition to the first concave portion 63, a second concave portion 64, corresponding to the first concave portion 63, is formed in the cover 32*b* of the second casing 32.

Figure 6B:
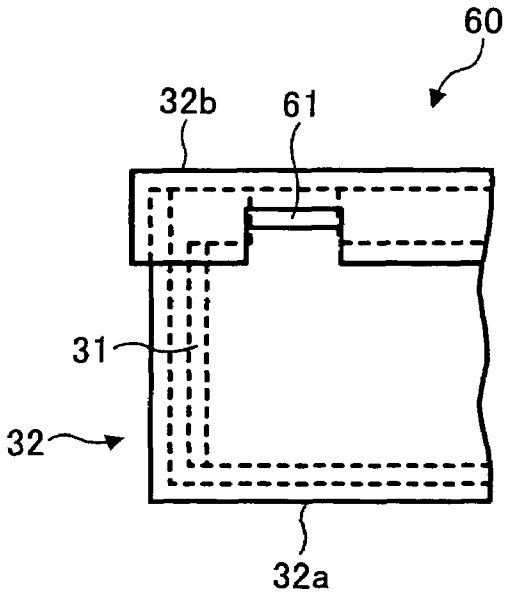
FIG. 6B is a partial view of the first casing and the second casing of FIG. 5 coupled to one another.

As illustrated in FIG. 6B, the connection member 61 of the first casing 31 is engaged to the first concave portion 63 to encase the first casing 31 in the second casing 32. Then, the second concave portion 64 is engaged to the connection member 61 such that the cover 32*b* is fitted to the body 32*a*.

By this configuration, the connection member 61 is sandwiched by or disposed between the first concave portion 63 and the second concave portion 64, resulting in a connection of the first casing 31 and the second casing 32.

By this arrangement, even if the second casing 32 expands or contracts due to a temperature change, the effect of such expansion or contraction on the first casing 31 can be reduced because the first casing 31 is directly connected to the frame of the housing 2 via the connection member 61.

Therefore, a positional displacement of the optical elements supported in the first casing 31 can be significantly reduced.

Accordingly, irradiation positions of the light beam emitted from the optical writing apparatus 60 on each of the photoconductive members 6Y, 6C, 6M, and 6K can be maintained at adequate positions.

In the above described another embodiment of the present invention, the optical writing apparatus 60 can be connected to the housing 2 by aligning and fixing the connection member 61 of the first casing 31 to a counterpart connection member (not shown) formed in the housing 2 with a screw (not shown).

Accordingly, the optical writing apparatus 60 can be securely connected to the housing 2 with a simple operation.

Numerous additional modifications and variations are possible in light of the above teachings. It is therefore to be understood that within the scope of the appended claims, the disclosure of the present invention may be practiced otherwise than as specifically described herein.

What is claimed is:

1. An image forming apparatus, comprising:

a first support member;

an image carrying member configured to carry a toner image thereon; and an optical writing apparatus connected to the first support member and configured to form an electrostatic latent image on the image carrying member, the optical writing apparatus comprising:

an optical system comprising at least one optical element;

a first casing configured to support the optical system; and a second casing configured to encase the first casing and to prevent intrusion of dust to the optical system.

2. The image forming apparatus according to claim 1, wherein the first casing comprises a material having a line expansion coefficient less than a line expansion coefficient of a material of the second casing.

3. The image forming apparatus according to claim 1, wherein a material of the first casing comprises metal.

4. The image forming apparatus according to claim 3, wherein the metal comprises at least one of iron and aluminum.

5. The image forming apparatus according to claim 1, wherein a material of the second casing comprises a resinous material.

6. The image forming apparatus according to claim 1, wherein the first casing comprises at least one open side.

7. The image forming apparatus according to claim 1, wherein the second casing comprises at least one opening configured to permit passage of a light beam emitted from the optical system.

8. The image forming apparatus according to claim 1, wherein the first casing is connected to the second casing.

9. The image forming apparatus according to claim 1, wherein the first casing comprises at least one first connection member configured to be connected to the first support member.

10. The image forming apparatus according to claim 9, wherein the first connection member protrudes from the second casing.

11. The image forming apparatus according to claim 1, wherein the first casing has a substantially same line expansion coefficient as the first support member.

12. The image forming apparatus according to claim 1, wherein the second casing comprises at least one second connection member configured to be connected to the first support member, and the first casing and the second casing are configured to be connected with each other at an area adjacent the at least one second connection member.

13. The image forming apparatus according to claim 1, further comprising:

an intermediate transfer member configured to receive the toner image from the image carrying member.

14. The image forming apparatus according to claim 13, further comprising:

a second support member configured to support the intermediate transfer member.

15. The image forming apparatus according to claim 14, wherein the second support member is connected to the first support member.

16. The image forming apparatus according to claim 14, wherein the second support member has a substantially same line expansion coefficient as the first support member.

17. The image forming apparatus according to claim 1, wherein the optical system comprises a light source.

18. The image forming apparatus according to claim 1, wherein the optical system comprises a light deflector.

19. The image forming apparatus according to claim 1, wherein the optical system comprises a scanning lens.

20. The image forming apparatus according to claim 1, wherein the optical system comprises a synchronization detector.

21. The image forming apparatus according to claim 1, wherein the optical system comprises a reflection mirror.

22. An image forming apparatus, comprising:

means for supporting;

means for carrying an image; and means for optically writing an electrostatic latent image on the means for carrying, the means for optically writing connected to the means for supporting, the means for optically writing comprising:

an optical system comprising at least one optical element;

a first casing configured to support the optical system; and a second casing configured to encase the first casing and to prevent intrusion of dust to the optical system.

23. An optical writing apparatus configured to be connected to a first supporting member of an image forming apparatus, comprising:

an optical system comprising at least one optical element;

a first casing configured to support the optical system; and a second casing configured to encase the first casing and to prevent intrusion of dust to the optical system.

24. The optical writing apparatus according to claim 23, wherein the first casing comprises a material having a line expansion coefficient less than a line expansion coefficient of a material of the second casing.

25. The optical writing apparatus according to claim 23, wherein a material of the first casing comprises metal.

26. The optical writing apparatus according to claim 25, wherein the metal comprises at least one of iron and aluminum.

27. The optical writing apparatus according to claim 23, wherein a material of the second casing comprises a resinous material.

28. The optical writing apparatus according to claim 23, wherein the first casing comprises at least one open side.

29. The optical writing apparatus according to claim 23, wherein the second casing comprises at least one opening configured to permit passage of a light beam emitted from the optical system.

30. The optical writing apparatus according to claim 23, wherein the first casing is connected to the second casing.

31. The optical writing apparatus according to claim 23, wherein the first casing comprises at least one first connection member configured to be connected to the first supporting member.

32. The optical writing apparatus according to claim 31, wherein the first connection member protrudes from the second casing.

33. The optical writing apparatus according to claim 23, wherein the first casing has a substantially same line expansion coefficient as the first supporting member.

34. The optical writing apparatus according to claim 33, wherein the second casing comprises at least one second connection member configured to be connected to the first supporting member, and the first casing and the second casing are configured to be connected with each other at an area adjacent the at least one second connection member.

35. The optical writing apparatus according to claim 23, wherein the optical system comprises a light source.

36. The optical writing apparatus according to claim 23, wherein the optical system comprises a light deflector.

37. The optical writing apparatus according to claim 23, wherein the optical system comprises a scanning lens.

38. The optical writing apparatus according to claim 23, wherein the optical system comprises a synchronization detector.

39. The optical writing apparatus according to claim 23, wherein the optical system comprises a reflection mirror.

40. An optical writing apparatus configured to be connected to a first supporting member of an image forming apparatus, comprising:

an optical system having at least one optical element;

means for supporting the optical system, comprising a first material having a first line expansion coefficient; and means for encasing the means for supporting and for preventing intrusion of dust to the optical system, the means for encasing comprising a second material having a second line expansion coefficient, wherein the first line expansion coefficient is less than the second line expansion coefficient.

41. The optical writing apparatus according to claim 40, wherein the first material comprises metal.

42. The optical writing apparatus according to claim 41, wherein the metal comprises at least one of iron and aluminum.

43. The optical writing apparatus according to claim 40, wherein the second material comprises a resinous material.

44. The optical writing apparatus according to claim 40, wherein the means for supporting comprises at least one open side.

45. The optical writing apparatus according to claim 40, wherein the means for encasing comprises at least one opening configured to permit passage of a light beam emitted from the optical system.

46. The optical writing apparatus according to claim 40, wherein the means for supporting is connected to the means for encasing.

47. The optical writing apparatus according to claim 40, wherein the means for supporting comprises at least one first connection member configured to be connected to the first supporting member.

48. The optical writing apparatus according to claim 47, wherein the at least one first connection member protrudes from the means for encasing.

49. The optical writing apparatus according to claim 40, wherein the means for supporting has a substantially same line expansion coefficient as the first supporting member.

50. The optical writing apparatus according to claim 40, wherein the means for encasing comprises at least one second connection member configured to be connected to the first supporting member, and the means for supporting and the means for encasing are configured to be connected with each other at an area adjacent the at least one second connection member.

51. A method of providing an optical writing apparatus for an image forming apparatus, comprising:

providing an optical system having at least one optical element in a first casing;

disposing the first casing in a second casing; and covering the second casing with a cover.

52. The method according to claim 51, wherein the first casing comprises a material having a line expansion coefficient less than a line expansion coefficient of a material of the second casing.

53. The method according to claim 51, wherein a material of the first casing comprises metal.

54. The method according to claim 53, wherein the metal comprises at least one of iron and aluminum.

55. The method according to claim 51, wherein a material of the second casing comprises a resinous material.

56. The method according to claim 53, wherein the first casing comprises at least one open side.

57. The method according to claim 53, wherein the second casing comprises at least one opening configured to permit passage of a light beam emitted from the optical system.

58. The method according to claim 53, wherein the first casing is connected to the second casing.

* * * * *